(12) United States Patent
Mazur

(10) Patent No.: US 8,151,817 B2
(45) Date of Patent: Apr. 10, 2012

(54) APPARATUS FOR ISOLATING ELBOW FITTINGS

(76) Inventor: Ivan Mazur, Leduc (CA)

( * ) Notice: Subject to any disclaimer, the term of this patent is extended or adjusted under 35 U.S.C. 154(b) by 291 days.

(21) Appl. No.: 12/546,576

(22) Filed: Aug. 24, 2009

(65) Prior Publication Data

US 2011/0041926 A1    Feb. 24, 2011

(51) Int. Cl.
*F16L 41/06* (2006.01)
*B23B 41/08* (2006.01)

(52) U.S. Cl. .............. 137/15.13; 137/318; 408/72 R

(58) Field of Classification Search ............... 137/318, 137/317, 15.13; 285/197, 179; 408/72 R
See application file for complete search history.

(56) References Cited

U.S. PATENT DOCUMENTS

| | | | | |
|---|---|---|---|---|
| 3,643,986 A | * | 2/1972 | Allan | 285/197 |
| 4,270,559 A | * | 6/1981 | Wallberg | 137/318 |
| 4,537,071 A |  | 8/1985 | Waterman | |
| 4,859,403 A | * | 8/1989 | Dixon et al. | 137/375 |
| 5,058,620 A |  | 10/1991 | Jiles | |
| 5,400,492 A | * | 3/1995 | Hodgson et al. | 137/318 |
| 5,519,929 A |  | 5/1996 | Bleckman | |
| 6,108,391 A | * | 8/2000 | Deaver et al. | 376/262 |
| 6,343,616 B1 | * | 2/2002 | Houtchens | 137/318 |
| 6,640,827 B1 |  | 11/2003 | McClure | |
| 6,892,752 B2 |  | 5/2005 | Burlock | |

FOREIGN PATENT DOCUMENTS

CA    2 515 275 A1    2/2007

OTHER PUBLICATIONS

"Pipeline Plugs and Accessories/Products," M.E. Barber Company, <http://www.mebarberco.com>, available as early as 2003, 2 pages.
"Small Drilling Machines," Mueller Co. Gas Products Division, Product Catalog, available at least as early as 2003, 1 page.

* cited by examiner

*Primary Examiner* — Kevin Lee
(74) *Attorney, Agent, or Firm* — Christensen, O'Connor Johnson Kindness PLLC

(57) ABSTRACT

An apparatus for isolating elbow fittings includes a fluid containing elbow housing with cooperating components. The elbow housing has a first opening for a first branch of an elbow, a second opening for a second branch of an elbow and a tool insertion opening in axial alignment with the first opening. The cooperating components of the elbow housing are secured around an elbow. A seal seals the first opening, the second opening, and the cooperating components. An isolation valve controls the tool insertion opening.

4 Claims, 4 Drawing Sheets

APPARATUS FOR ISOLATING ELBOW FITTINGS

FIELD

This apparatus relates to elbow fittings on pressurized fluid lines.

BACKGROUND

Hot tapping is a known technique for forming openings in pressurized fluid lines. U.S. Pat. No. 6,640,827 (McClure) is an example of a hot tapping tool. Plug setting tools are known. Canadian Patent 2,515,275 (Mazur) is an example of a plug setting tool. Hot tapping and plug setting technologies are currently considered unsuitable for use with elbow fittings.

SUMMARY

There is provided an apparatus for isolating elbow fittings, which comprises a fluid containing elbow housing comprised of cooperating components. The elbow housing has a first opening for a first branch of an elbow, a second opening for a second branch of an elbow and a tool insertion opening in axial alignment with the first opening. The cooperating components of the elbow housing are capable of being secured around an elbow. A seal seals the first opening, the second opening, and the cooperating components. First and second seals are provided for sealing an elbow fitting within the elbow housing. An isolation valve controls the tool insertion opening.

Through the use of the above apparatus, an elbow fitting can be isolated. A hot tapping tool can be attached to the isolation valve and a drill bit inserted through the tool insertion opening to drill through a radiused portion of the elbow fitting. A plug setting tool can then be attached to the isolation valve and a plug inserted through the tool insertion opening and set in or below the elbow fitting.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
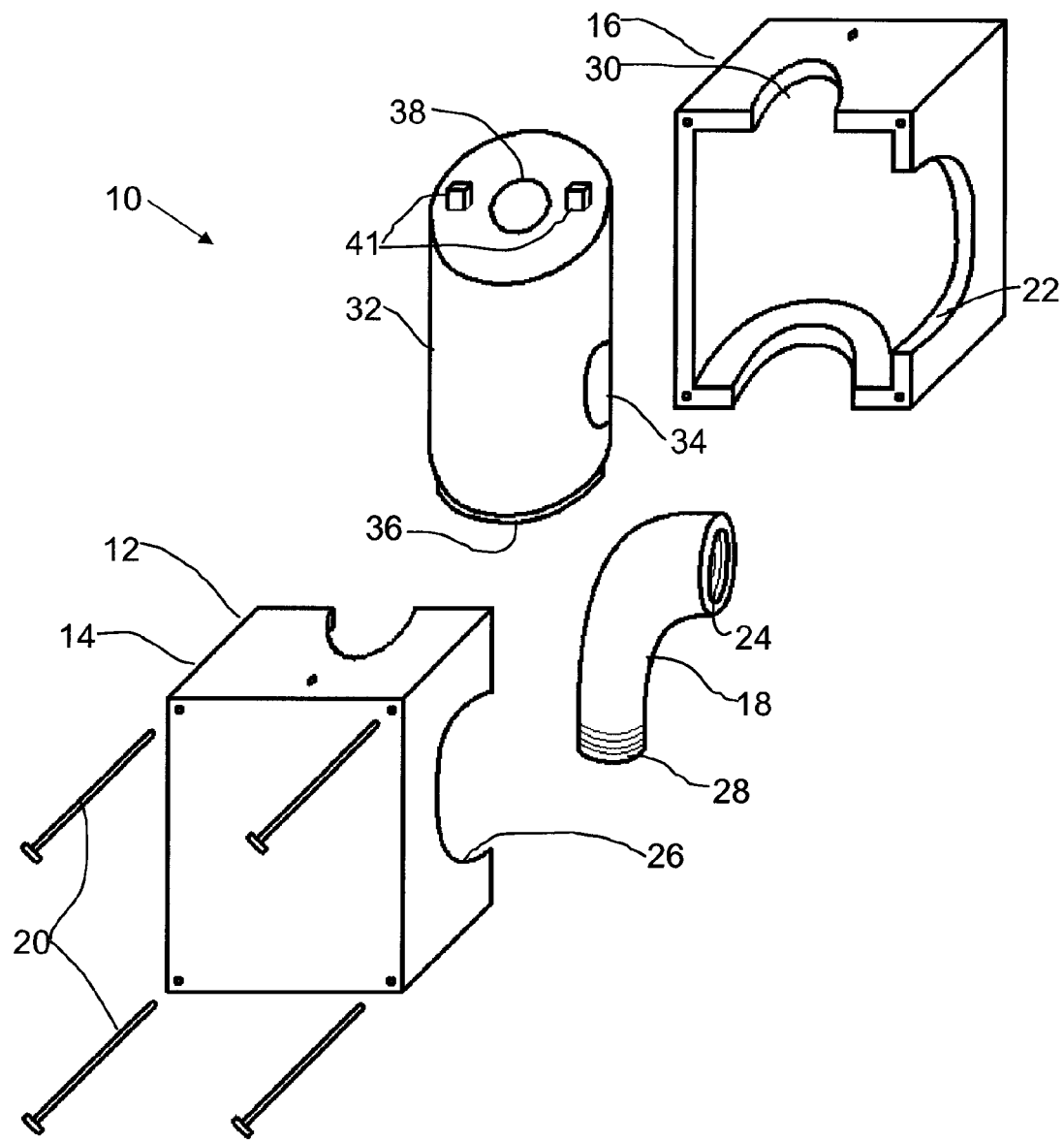
FIG. 1 is an exploded view of a fluid containing elbow housing.
Figure 2:
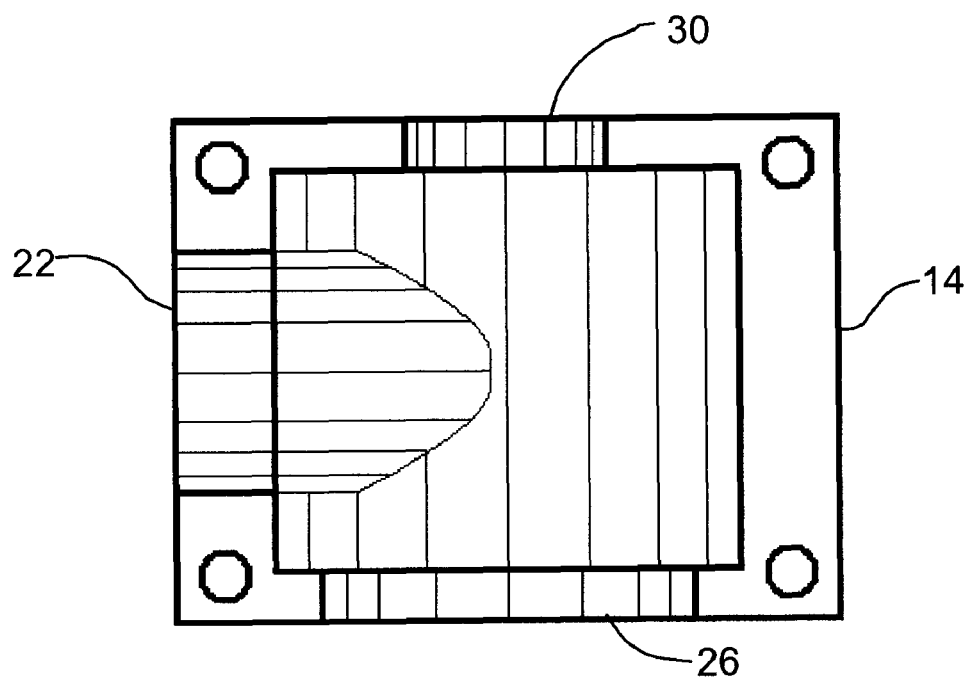
FIG. 2 is a side elevation view of a portion of the elbow housing.
Figure 3:
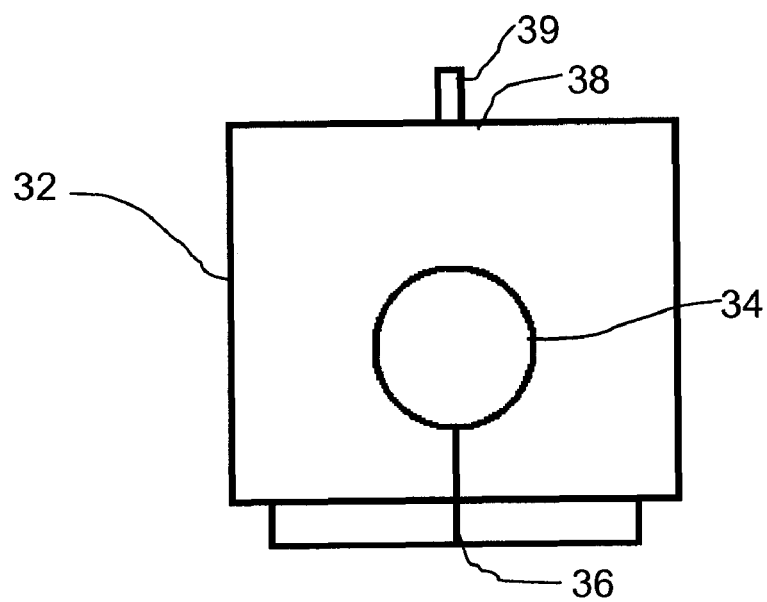
FIG. 3 is a front elevation view of the seal.
Figure 6:
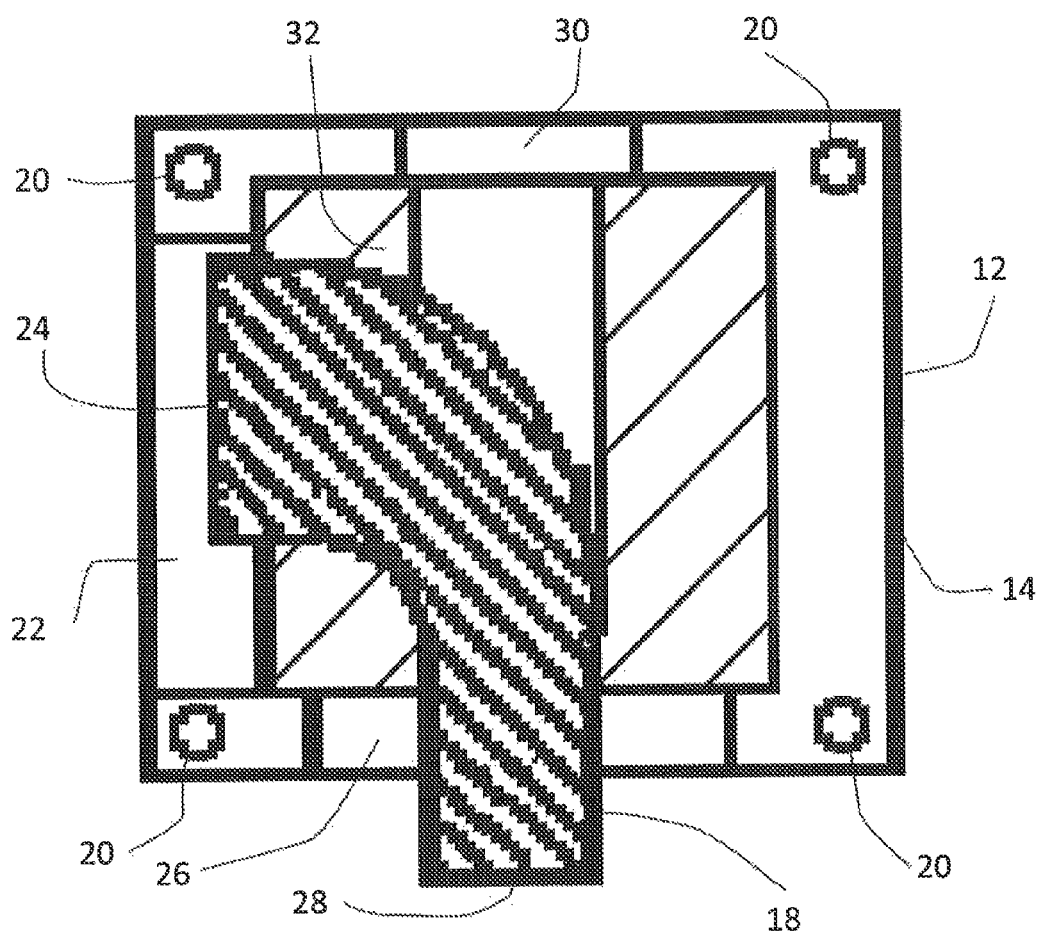
FIG. 6 is a detailed side elevation view in section or the elbow isolation fitting in a seal and an elbow housing.

An apparatus for isolating elbow fittings, generally identified by reference numeral 10, will now be described with reference to FIGS. 1 through 6.
Structure and Relationship of Parts:

Referring to FIG. 2, apparatus 10 includes a fluid containing elbow housing 12 comprised of cooperating components 14 and 16, which, as shown, are two halves that connect together to form elbow housing 12. Cooperating components 14 and 16 are used to allow housing 12 to be assembled around an elbow fitting 18, and may take different forms than what is depicted. Elbow fitting 18 may be a standard elbow or a street elbow. Elbow housing 12 has a first opening 22 for a first branch 24 of elbow fitting 18, a second opening 26 for a second branch 28 of elbow fitting 18 and a tool insertion opening 30 in axial alignment with first opening 22. Means, such as bolts 20 as depicted, are provided for securing cooperating components 14 and 16 of elbow housing 12 around elbow fitting 18. A seal 32 is provided that is depicted as a cylindrical seal that seals elbow fitting 18 in first opening 22 and in second opening 26. Seal 32 has elbow openings 34 and 36 that correspond to elbow fitting 18 and a drill bit opening 38 on top. When housing 12 is assembled, pressure is applied to seal 32 to seal these openings. Referring to FIG. 2, housing 12 is radiused inside to receive seal 32. FIG. 6 shows seal 32 within housing 12 and around elbow fitting 18. Referring to FIG. 1, as seal 32 completely surrounds elbow fitting 18 within housing 12, the joint between cooperating components 14 and 16 is also sealed. Referring to FIG. 3, seal 32 has tabs 39 adjacent to drill bit opening 38. These tabs 39 are extruded when assembled, and seal against the bottom of the adapter 42 discussed below. Preferably, seal 32 is split between openings 34 and 36, which allows it to be assembled by inserting elbow fitting 18 into seal 32 through the split. The depicted seal 32 is designed to be used with a particular size of elbow fitting 18, and other seals 32 may be provided for larger or smaller elbow fittings 18. Because seal 32 is fitted to elbow 18 and fills the cavity in housing 12, openings 22 and 26 can be designed to accommodate larger fittings and still be used for smaller fittings.

Figures 4, 5:
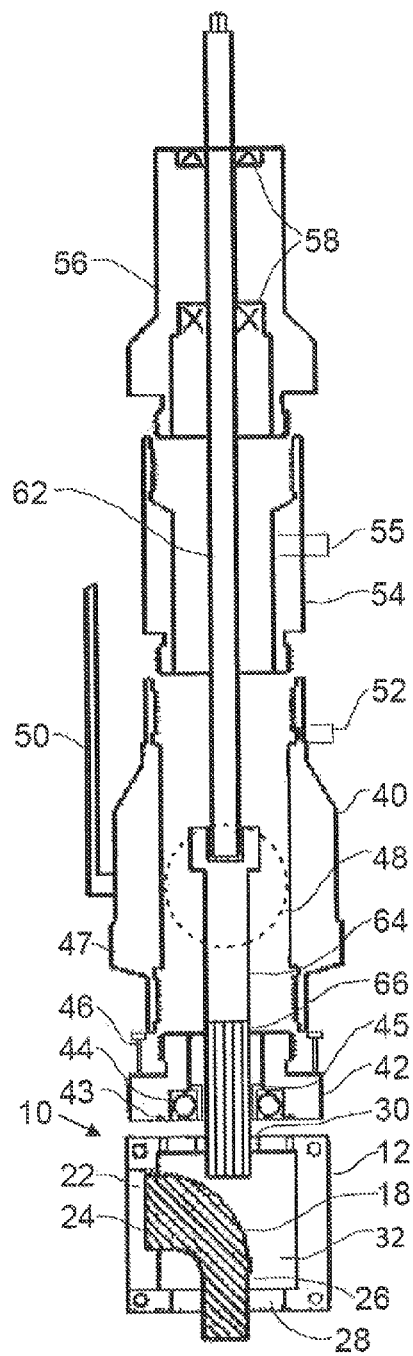
FIG. 4 is a side elevation view in section of the apparatus for isolating elbow fittings with a drilling tool attached.
FIG. 5 is a side elevation view in section of the apparatus for isolating elbow fittings with a plug setting tool attached.

Referring to FIG. 4, an isolation valve 40 controls tool insertion opening 30 and attaches to elbow housing 12 by an adapter 42 that has internal bearings 44, and is attached to elbow housing 12 using bolts 46. Adapter 42 seals tool insertion opening 30 by seal 43, and may have an insert 45 that can be replaced to support different sizes of drill bits. Isolation valve 40 has an elongate housing 47 with a ball valve 48 controlled by a handle 50, and a bleeder valve 52 above ball valve 48. An upper housing extension 54 is included with a pressure tap 55. Upper housing extension 54 is designed to attach to different tools, such as a drill shaft housing 56 as depicted in FIG. 1, which has seals 58 to seal around a drill bit shaft 62 against any pressure from escaping from the piping system once elbow fitting 18 has been breached. Other tools that may be attached may include a plug setting tool, a plug installation or removal tool, a thread die, etc.

The depicted isolation valve 40 is similar in design to what is described in U.S. patent publication no. 20070095397, and therefore requires adapter 42 to attach to elbow housing 12, and housing extension 54. It will be understood that isolation valve 40 may be constructed with the necessary connection and with the necessary length. However, isolation valve 40 as depicted is designed to be used for various purposes.

Upper housing extension 54 is designed to attach to various tools including a drill shaft housing 62 as shown, through drill shaft housing 56.
Operation:

The tool described above and shown in the drawings is useful servicing an elbow fitting 18. Below is described a situation where apparatus 10 may be used.

In order to drill and plug elbow fitting 18, elbow fitting 18 is first cleaned to remove any coating, dirt and scale. A proper sized elbow seal 32 is slipped over elbow 18 to seal each branch 24 and 28 and encompass them. The cooperating components 14 and 16 of housing 12 are then installed over seal 32 and bolts 20 secure them together to form a seal around seal 32 and the inner surface of elbow housing 12. Valve adapter 42 is mounted to elbow housing and secured by bolts 46. Isolation valve 40 is then mounted on valve adapter 42 and upper housing extension 54 is mounted on isolation valve 40. An appropriately sized drill bit adapter 64 and drill bit 66 are selected for the size of elbow to be drilled. As drill bit 66 will be drilling through an angled surface, a preferred embodiment of drill bit 66 is designed to facilitate this easier, such as providing less aggressive teeth on bit 66, and including a pilot bit (not shown). Drill bit adapter 64 is mounted to drill bit shaft 62, and drill bit 66 is mounted to drill bit adapter 64. Drill bit shaft 62 is slid into drill shaft housing 56, which is then secured to upper housing extension 54. The connections may then be pressure tested using pressure tap 55 for a proper seal. Drill bit 66 is lowered through isolation valve 40 and is engaged with the upper radius of elbow fitting 18. Drill bit 66 is then used to drill into the inner surface of elbow fitting 18. If necessary, the drill operation may be extended into the throat of elbow fitting 18 or into the main line to drill a uniform hole. Once the hole has been drilled, drill bit 66 is withdrawn past ball valve 48 in isolation valve 40, which is then closed. Gas above isolation valve 40 is bled off using bleeder valve 52, which allows upper housing extension 54 and drill shaft housing 56 to be removed.

Once the hole has been drilled, elbow fitting 18 may be replaced by attaching a plug setting tool 67 to isolation valve 40, such as the tool described in U.S. patent publication no. 20070095397. Referring to FIG. 5, a plug 68 is mounted on an expander tool shaft 70. Once bleeder valve 52 has been closed, isolation valve 40 may again be opened and plug 68 is lowered until it is positioned in or below elbow fitting 18, where it is set, such as by turning an inner shaft that causes plug 68, such as a rubber expander plug, to expand. Plug 68 may be installed in elbow fitting 18, in the main line (not shown), or in the elbow receiving fitting (not shown). The expander tool shaft 70 is disengaged from plug 68, and the gas in the line has been released in a suitable manner. Before removing plug setting tool 67 or isolation valve 40, bleeder valve 52 is opened to confirm depressurization. With plug 68 installed and set below elbow 18, elbow 18 is removed, and a threaded plug (not shown) is installed to replace elbow 18, either externally threaded or internally threaded, depending on the type of elbow removed.

Once a hole has been drilled in elbow fitting 18, it may be desirable to thread a hole in the main line. With elbow housing 12, isolation valve 40 and upper housing extension 54 installed as described above, a similar arrangement to what is shown in FIG. 4 is used, where drill bit 66 is replaced with a thread die. Similar to drill bit 66, the thread die is lowered through open ball valve 48 into elbow fitting 18 to engage the hole in main line, and is turned clock-wise to thread the hole. A plug setting tool, similar to what is shown in FIG. 5 except a threaded plug instead of an expandable plug is installed to plug the now-threaded hole in main line.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. An apparatus for isolating elbow fittings, comprising:
   a fluid containing elbow housing comprised of cooperating components, the elbow housing having a first opening for a first branch of an elbow fitting, a second opening for a second branch of the elbow fitting and a tool insertion opening in axial alignment with the first opening;
   means for securing the cooperating components of the elbow housing around the elbow fitting;
   a seal for sealing the first opening, the second opening, and the cooperating components; and
   an isolation valve controlling the tool insertion opening.

2. The apparatus of claim 1, wherein the seal encompasses the elbow fitting.

3. The apparatus of claim 2, wherein the fluid containing elbow housing defines a cavity, the seal being designed to fit within the cavity such that, when assembled, the cavity is substantially filled by the seal.

4. A method of removing an elbow fitting from a fluid line, comprising:
   securing a fluid containing elbow housing comprising more than one component around an elbow fitting and attaching an isolation valve to a tool insertion opening in the elbow housing;
   securing a hot tapping tool to the isolation valve, inserting a drill bit of the hot tapping tool through the tool insertion opening into the elbow housing and drilling an opening through a radiused portion of the elbow fitting;
   securing a plug setting tool to the isolation valve inserting a plug of the plug setting tool through the tool insertion opening into the elbow housing and setting the plug in or below the elbow fitting; and
   cutting or removing the elbow housing from the fluid line above the position of the plug.

* * * * *